(12) United States Patent
Zajac et al.

(10) Patent No.: US 11,001,527 B2
(45) Date of Patent: May 11, 2021

(54) COMPOSITE CEMENT AND METHOD OF MANUFACTURING COMPOSITE CEMENT

(71) Applicant: HeidelbergCement AG, Heidelberg (DE)

(72) Inventors: Maciej Zajac, Heidelberg (DE); Mohsen Ben Haha, Heidelberg (DE); Gerd Bolte, Schriesheim (DE)

(73) Assignee: HConnect 2 GmbH, Heidelberg (DE)

( * ) Notice: Subject to any disclaimer, the term of this patent is extended or adjusted under 35 U.S.C. 154(b) by 0 days.

(21) Appl. No.: 16/609,521

(22) PCT Filed: Jun. 4, 2018

(86) PCT No.: PCT/EP2018/064601
§ 371 (c)(1),
(2) Date: Oct. 30, 2019

(87) PCT Pub. No.: WO2018/228839
PCT Pub. Date: Dec. 20, 2018

(65) Prior Publication Data
US 2020/0079694 A1  Mar. 12, 2020

(30) Foreign Application Priority Data

Jun. 14, 2017 (EP) .................... 17175954.1

(51) Int. Cl.
| C04B 28/16 | (2006.01) |
| C04B 14/28 | (2006.01) |
| C04B 24/12 | (2006.01) |
| C04B 28/08 | (2006.01) |
| C04B 40/00 | (2006.01) |

(52) U.S. Cl.
CPC ............ *C04B 28/16* (2013.01); *C04B 14/28* (2013.01); *C04B 24/122* (2013.01); *C04B 28/08* (2013.01); *C04B 40/0039* (2013.01)

(58) Field of Classification Search
CPC .... C04B 7/02; C04B 7/19; C04B 7/26; C04B 7/52; C04B 7/527; C04B 14/048; C04B 14/10; C04B 14/26; C04B 14/28; C04B 18/08; C04B 22/0013; C04B 22/143; C04B 22/147; C04B 22/16; C04B 24/003; C04B 24/06; C04B 24/18; C04B 24/122; C04B 28/04; C04B 28/08; C04B 28/16; C04B 40/0039; C04B 2103/30; C04B 2111/00672; C04B 2111/60; Y02P 40/10; Y02W 30/91
See application file for complete search history.

(56) References Cited

U.S. PATENT DOCUMENTS 9,604,879 B2  3/2017  Schmitt et al.
9,718,731 B2  8/2017  Bullerjahn et al.
10,065,888 B2  9/2018  Schmitt et al.
10,494,298 B1 * 12/2019 Guynn ...................... C04B 7/26
2014/0174325 A1  6/2014  Pardal et al.

FOREIGN PATENT DOCUMENTS

| EP | 2801559 A1 | 11/2014 |
| EP | 3109216 A1 | 12/2016 |
| WO | 2015045194 A1 | 3/2017 |

OTHER PUBLICATIONS

Machine Translation of PCT International Patent No. WO 2015/045194 A1 (Year: 2015).*
International Search Report of PCT/EP2018/064601, dated Jul. 13, 2018.
Cementitious Materials, Technical Report No. 74 Concrete Society Working Party, Published Dec. 2011, http://www.concrete.org.uk/publications-tech-nical-reports.asp, pp. 1-70.
Future Grinding Technologies—Report about Phase 1: Evaluation of Round table Event, technical report TR 127/2015, European Cement Research Academy, Published 2015, https://ecra-online.org/research/future-grinding-technologies/, pp. 1-16.
J. Trenkwald, H.M. Ludwig, Herstellung hüttensandhaltiger Zemente durch getrenntes Mahlen und Mischen im Zementwerk Karlstadt, ZKG International No. 09/2001, vol. 54, pp. 480-491.
M. Oner, K. Erdogdu, A. Gunlu, Effect of components fineness on strength of blast furnace slag cement, Cement and Concrete Research 33 (2003), pp. 463-469.
Tongsheng Zhang, Qijun Yu, Jiangxiong Wei, Pingping Zhang, Peixin Chen, A gap-graded particle size distribution for blended cements: Analytical approach and experimental validation, Powder Technology 214 (2011), pp. 259-268.
Tongsheng Zhang, Qijun Yu, Jiangxiong Wei, Pingping Zhang, A new gap-graded particle size distribution and resulting consequences on properties of blended cement, Cement & Concrete Composites 33 (2011), pp. 543-550.
Tongsheng Zhang, Qijun Yu, Jiangxiong Wei, Pingping Zhang, Effects of size fraction on composition and fundamental properties of Portland cement, Construction and Building Materials 25 (2011), pp. 3038-3043.
S. Palm, A. Wolter, Strength development of multi-composite cements with optimized void filling, Cement International Jan. 2011, pp. 56-64.
Kyle Riding, Denise A. Silva, Karen Scrivener, Early age strength enhancement of blended cement systems by CaCl2 and diethanol-isopropanolamine, Cement and Concrete Research 40 (2010), pp. 935-946.
J. Cheung, A. Jeknavorian, L. Roberts, D. Silva, Impact of admixtures on the hydration kinetics of Portland cement, Cement and Concrete Research 41 (2011), pp. 1289-1309.

(Continued)

*Primary Examiner* — Anthony J Green
(74) *Attorney, Agent, or Firm* — Collard & Roe, P.C.

(57) ABSTRACT

The present invention relates to a composite cement obtainable by grinding Portland cement clinker and latent hydraulic material together, preferably in the presence of at least one amine grinding aid, to provide a ground mixture and combining the ground mixture with a mineral filler. It further relates to a method of manufacturing the composite cement comprising the steps of grinding a latent hydraulic material and a portland cement clinker together, preferably in the presence of at least one amine, to provide a ground mixture and combining the ground mixture with one or more mineral fillers as well as to binders and to using the cement or binders as building material.

20 Claims, No Drawings

(56) References Cited

OTHER PUBLICATIONS

Suhua Ma, Weifeng Li, Shenbiao Zhang, Yueyang Hu, Xiaodong Shen, Study on the hydration and microstructure of Portland cement containing diethanol-isopro¬panolamine, Cement and Concrete Research 67 (2015), pp. 122-130.
Zhang Yan-Rong, Kong Xiang-Ming, Lu Zi-Chen, Lu Zhen-Bao, Zhang Qing, Dong Bi-Qin, Influence of triethanolamine on the hydration product of portlandite in cement paste and the mechanism, Cement and Concrete Research 87 (2016), pp. 64-76.
Beixing Li et al: Study on high-strengthcomposite portland cement with a larger amount of industrial wastes11, Cement and Concrete Research, vol. 32, No. 8, Aug. 1, 2002 (Aug. 1, 2002), pp. 1341-1344.
Klaartje De Weerdt et al: SINTEF Report Title Coin PI Advanced cementing materials SP 1.1 F Reduced CO 2-emissions Separate grinding versus intergrinding State of the art Author(s)11, Jul. 17, 2007 (Jul. 17, 2007), XP055488960, ISBN: 978-82-536-0986-7; Retrieved from the Internet: URL:https://www.sintef.no/globalassets/sintef-byggforsk/coin/sintef-reports/sbf-bk-a 07022 separate-grinding-versus-intergrinding.pdf [retrieved on Jun. 28, 2018], pp. 1-33.
International Preliminary Report on Patentability dated Dec. 26, 2019 issued in PCT/EP2018/064601.

\* cited by examiner

COMPOSITE CEMENT AND METHOD OF MANUFACTURING COMPOSITE CEMENT

CROSS REFERENCE TO RELATED APPLICATIONS

This application is the National Stage of PCT/EP2018/064601 filed on Jun. 4, 2018, which claims priority under 35 U.S.C. § 119 of European Application No. 17175954.1 filed on Jun. 14, 2017, the disclosures of which are incorporated by reference. The international application under PCT article 21(2) was not published in English.

BACKGROUND OF THE INVENTION

The present invention relates to a composite cement obtainable by grinding Portland cement clinker and a latent hydraulic material together to provide a ground mixture and combining the ground mixture with a mineral filler, to a method of manufacturing the cement as well as to binders containing the cement and to using the cement or binder as building material.

Portland composite cements are increasingly used. In composite cements the Portland cement clinker, frequently referred to as clinker hereinafter, is replaced by other constituents like granulated blast furnace slag, abbreviated slag or GBFS hereinafter, fly ash and limestone. The composite cement is typically composed of two reactive components. Within the last years the production of composite cements has reached a constant level due to the limited availability of GBFS and fly ash. Thus, ternary blends including limestone move into focus. In order to increase the amount of composite cement an increase of the proportion of ternary blends including the high limestone proportions is required.

Increasing amounts of limestone (or other inert fillers) affect the strength of the hardened binder. The early compressive strength of the composite cements also suffers from a low reactivity of the slag. One solution is the addition of alkali sulphate that improves the evolution of the compressive strength of composite cements. This measure is limited by allowable total alkali content.

Another typical solution is an increase of the fineness of the cement clinker. The grindability of clinker and the other components slag, fly ash, limestone differs from each other and also a given component shows some variability of grinding behaviour depending on actual composition. Thus, it is generally believed that higher fineness in turn requires a separate grinding of clinker and the other cement components. Several technical reports indicate that separate grinding of the cement components followed by blending them (homogenization) is particularly suited to Portland-slag cement or blast furnace cement production, where the significant difference in grindability of the different constituents can be problematic for the inter-grinding process and blending separately ground slag with cement or clinker is beneficial:

Cementitious Materials, Technical Report No. 74 Concrete Society Working Party, Published December 2011, http://www.concrete.org.uk/publications-technical-reports.asp Future Grinding Technologies—Report about Phase 1: Evaluation of Roundtable Event, technical report TR 127/2015, European Cement Research Academy, Published 2015, https://ecra-online.org/research/future-grinding-technologies/

J. Trenkwald, H. M. Ludwig, Herstellung hüttensandhaltiger Zemente durch getrenntes Mahlen und Mischen im Zementwerk Karlstadt, ZKG September 2001.

Several publications find that a tailored particle size distribution of cement components provides appropriate performance of composite cements that have high cement clinker replacement ratio:

M. Onera, K. Erdogdu, A. Gunlu, Effect of components fineness on strength of blast furnace slag cement, Cement and Concrete Research 33 (2003) 463-469

Tongsheng Zhang, Qijun Yu, Jiangxiong Wei, Pingping Zhang, Peixin Chen, A gap-graded particle size distribution for blended cements: Analytical approach and experimental validation, Powder Technology 214 (2011) 259-268

Tongsheng Zhang, Qijun Yu, Jiangxiong Wei, Pingping Zhang, A new gap-graded particle size distribution and resulting consequences on properties of blended cement, Cement & Concrete Composites 33 (2011) 543-550

Tongsheng Zhang, Qijun Yu, Jiangxiong Wei, Pingping Zhang, Effects of size fraction on composition and fundamental properties of Portland cement, Construction and Building Materials 25 (2011) 3038-3043

S. Palm, A. Wolter, Strength development of multi-composite cements with optimized void filling, CEMENT INTERNATIONAL January 2011, pp. 56-64 Separate grinding requires more installation and thereby increases capital expenditure.

Thus, there exists a need to provide composite binders that develop sufficient strength while allowing a high clinker replacement ratio. An improvement of the early compressive strength evolution as well as a reduction of the water demand of the composite cement is desirable.

It was now surprisingly found that ternary cements from latent hydraulic materials and Portland cement clinker ground together and combined with separately ground mineral fillers, especially limestone, show good performance while limiting clinker demand. Accordingly, the present invention solves the above mentioned problems by providing a composite cement obtainable by grinding a latent hydraulic material and a portland cement clinker together, preferably in the presence of at least one amine grinding aid, to provide a ground mixture and combining the ground mixture with one or more separately ground mineral fillers. The invention further solves the object with a method of manufacturing a composite cement comprising the steps of grinding a latent hydraulic material and a portland cement clinker together, preferably in the presence of at least one amine grinding aid, to provide a ground mixture and combining the ground mixture with one or more mineral fillers. Still further, the object is solved by binders containing the composite cement as well as by the use of the cement or binder as building material.

SUMMARY OF THE INVENTION

Detailed Description of the Invention

The composite cement according to the invention provides the following advantages: a synergy effect in the mechanical performance at early ages, a high early strength, and a not too high water demand. In contrast to what was believed in the prior art, co-grinding of the latent hydraulic material and the cement clinker is advantageous over separate grinding when producing composite cements.

The following abbreviations, which are common in the cement industry, are used: H—$H_2O$, C—CaO, A-$Al_2O_3$, F—$Fe_2O_3$, M—MgO, S—$SiO_2$ and $-SO_3$. So as to simplify the description, compounds are generally indicated in the pure forms thereof, without explicitly stating series of solid solutions/substitution by foreign ions and the like, as they are customary in technical and industrial materials. As any person skilled in the art will understand, the composition of the phases mentioned by name or formula in the present invention may vary, depending on the chemism of the raw meal and the type of production, due to the substitution with various foreign ions, such compounds likewise being covered by the scope of the present invention and comprised by the designation of the pure phases/compounds.

Within the context of the present invention, clinker shall mean a sinter product which is obtained by burning a raw material mixture at an elevated temperature and which contains at least one hydraulically reactive phase. Cement denotes a clinker that is ground with or without adding further components. Binder or binder mixture denotes a hydraulically hardening mixture containing cement and typically, but not necessarily, additional finely ground components, and which is used after adding water and aggregate, as well as optionally admixtures and/or additive.

Unless indicated otherwise, the term "reactive" means a hydraulic reactivity. A material has hydraulic reactivity when a paste made from the finely ground material by mixing it with water sets and hardens because of hydration reactions wherein the hardened product retains its soundness, strength and durability in air and under water.

Supplementary cementitious materials, abbreviated SCM herein, can be divided into latent hydraulic materials and pozzolans. Latent hydraulic materials are in principle hydraulic on their own but react only very slowly. They need an activation to undergo hydraulic reaction within useful time periods. Activation is typically achieved by (addition of) earth alkali metal or alkali metal compounds (e.g. $Ca(OH)_2$, NaOH, KOH, etc.) or sulfate providing materials ($CaSO_4$, $Na_2SO_4$, $K_2SO_4$, etc.), which are able to support the formation of calcium (aluminium) silicate hydrates and/or ettringite and/or others like e.g. $AF_m$-phases (strätlingite, monosulfate, monocarbonate hemicarbonate etc.) or zeolite-like mineral. Pozzolans are siliceous materials, alumino-siliceous materials or alumina containing materials that react with calcium hydroxide from other components of a binder to form calcium silicate hydrates, calcium aluminium silicate hydrates and/or calcium aluminium hydrates. The foregoing distinction cannot always be made strictly, i.e. many fly ashes contain considerable amounts of calcium and are latent hydraulic materials, therefore, but usually they are designated pozzolans, nonetheless. However, supplementary cementitious materials have to be distinguished from inert mineral fillers that are partly summarized with SCMs as mineral additions in the prior art.

Mineral fillers are obtained by processing natural, manufactured or recycled materials and mixtures of these. Typically they are characterized by a $d_{90}$ lower than 200 μm. The materials usually have an oven dried particle density of at least 2.0 g/cm$^3$.

The Portland cement clinker used for the composite cement according to the invention can be any known Portland cement clinker. A typical phase composition is 45 to 80% by weight $C_3S$, 1 to 40% by weight $C_2S$, 0 to 15% by weight $C_3A$, and 0 to 20% by weight $C_4AF$, wherein it is clear for an expert that the sum of all phases in the composition is always 100%. The chemical composition is generally 55 to 75% by weight CaO, 15 to 25% by weight $SiO_2$, 2 to 6% by weight $Al_2O_3$, 0 to 6% by weight $Fe_2O_3$, 0 to 2% by weight MgO, and 0 to 2% by weight $SO_3$.

The latent hydraulic material is preferably slag, especially granulated blast furnace slag abbreviated GBFS. GBFS is a by-product left over at metallurgical processes. Slag in general can be collected at ferrous and non-ferrous melting processes. It is usually covering the surface of molten metal. The most common material in cement industry is granulated blast furnace slag. Other latent hydraulic materials are also possible, e.g. calcium rich fly ash, burnt oil shale, fluidized bed ashes.

The mineral filler is typically selected from materials that are obtained by processing natural, manufactured or recycled materials and mixtures of these, e.g. stone dust, as defined in EN 12620 or similar, for example limestone dust, dolomite dust, marl dust, granite dust. Especially preferred is limestone. The fineness according to Blaine of the filler preferably ranges from 2500 cm$^2$/g to 12000 cm$^2$/g, more preferred from 3000 cm$^2$/g to 9000 cm$^2$/g, and most preferred from 3500 cm$^2$/g to 8000 cm$^2$/g.

A preferred composition of the composite cement is 30 to 75% by weight Portland cement clinker, 20 to 60% by weight latent hydraulic material, and 5 to 20% by weight mineral filler, a more preferred composition is 50 to 65% by weight Portland cement clinker, 30 to 40% by weight latent hydraulic material, and 5 to 15% by weight mineral filler, and the most preferred composition is 50% by weight of Portland cement clinker, 40% by weight of latent hydraulic material, and 10% by weight mineral filler, all with respect to the total amount of composite cement. A suitable weight ratio of Portland cement clinker to latent hydraulic material is from 0.8 to 3.0, preferred are from 1.0 to 2.0.

In a preferred embodiment, an amine grinding aid is added during grinding of the clinker and latent hydraulic material. Amines have been popularly used as one of the components of grinding aids for Portland cement. They are also known to be able to influence the hydration of Portland cements:

Kyle Riding, Denise A. Silva, Karen Scrivener, Early age strength enhancement of blended cement systems by CaCl2) and diethanol-isopropanolamine, Cement and Concrete Research 40 (2010) 935-946

J. Cheung, A. Jeknavorian, L. Roberts, D. Silva, Impact of admixtures on the hydration kinetics of Portland cement, Cement and Concrete Research 41 (2011) 1289-1309

Suhua Ma, Weifeng Li, Shenbiao Zhang, Yueyang Hu, Xiaodong Shen, Study on the hydration and microstructure of Portland cement containing diethanol-isopropanolamine, Cement and Concrete Research 67 (2015) 122-130

Zhang Yan-Rong, Kong Xiang-Ming, Lu Zi-Chen, Lu Zhen-Bao, Zhang Qing, Dong Bi-Qin, Influence of triethanolamine on the hydration product of portlandite in cement paste and the mechanism, Cement and Concrete Research 87 (2016) 64-76.

The preferably added amine(s) improve the strength as a result of grinding effect and chemical interactions. Especially preferred substances are Triethanolamine (TEA), Tri-isopropanolamine (TIPA), and Diethanolisopropanolamine (DEIPA). The amount is preferably in the range from 0.01 to 0.2% by weight relative to the sum of Portland cement clinker and latent hydraulic material. Further especially preferred amines are those described in EP 3 109 216 A1.

The cement can further contain natural or artificial pozzolans, e.g. but not exclusively type-F fly ashes, calcined clays or shales, trass, brick-dust, artificial glasses, silica fume, burned organic matter residues rich in silica such as rice husk ash, and mixtures of or more of the foregoing.

The cement according to the invention can be combined with admixtures and/or additives as well as with sulfates, forming the binder according to the invention.

Preferred admixtures are fluidity modifying agents, accelerators of hydration/hardening, set-retarding or hydration-controlling admixtures, especially preferred are plasticizers. Preferred plasticizers are one or any mixture of ligno-sulfonates, hydroxy carboxylic acids and salts thereof, gluconates, fruit acids, phosphonates, phosphates, boric acid and salts thereof.

Commercially available concrete additions can be used, if necessary, up to the maximum dosages specified by the manufacturer. Usual are glass fibres, polymer fibres, cement kiln dust, silica fume, pigments, for example. One or more of them are used.

Useful sulfates are calcium sulfate as anhydrite, hemi hydrate and dihydrate (gypsum), as well as alkali sulfates like sodium sulfate and potassium sulfate. Calcium sulfates and alkali sulfates are added up to a dosage providing an $SO_3$ content in the final binder/cement ≤5% by weight and an equivalent amount of $Na_2O$ in the final binder/cement lower than 3.5% by weight, preferably ≤2.0% by weight, relative to the weight of the latent hydraulic material. Typically the alkali sulfate is added in an amount resulting in an equivalent amount in the final binder/cement of ≥0.6% by weight, preferably ≥1.0% by weight, relative to the weight of the latent hydraulic material.

The method for manufacturing the composite cement corresponds to the known methods as far as manufacturing/providing cement clinker and latent hydraulic material is concerned. That is, the clinker is made in a manner known as such by burning a suitable raw meal typically in a rotary kiln. The latent hydraulic material is also obtained in the known way. In contrast to what was believed to be the best approach, the clinker and latent hydraulic material are ground together according to the invention. Preferably, an amine is added for grinding. The grinding itself can be carried out in any known device to the fineness desired. As is customary, a classifier can be used. Further, the grinding can take place in a two stage mill.

The fineness of the ground mixture obtained preferably ranges from 2500 $cm^2/g$ to 8000 $cm^2/g$, more preferred from 3000 $cm^2/g$ to 7000 $cm^2/g$ and most preferred from 3500 $cm^2/g$ to 6000 $cm^2/g$ according to Blaine.

The ground mixture is combined with the separately ground mineral filler(s) in the next step. The filler is also obtained in a manner known as such. For example, the preferred filler limestone is available as the ground raw material for clinker production. If more than one filler is used the fillers can be either ground together or separately. Combination of the ground mixture and the filler(s) is preferably achieved by homogenising in any known device used for grinding and/or in a static or dynamic powder mixing device.

The composite cement according to the invention obtained through the method according to the invention can be used in the same way as ordinary Portland cement. Typically, it will be combined with admixtures and/or additives to form a binder. The binder (and also the cement) can be combined with aggregates and water to make concrete for the production of pre-cast units, such as panels, beams, road parts, and cast-in situ concrete for the construction of buildings, dams, etc., and mortar. The cement and binder are also useful for manufacturing construction materials like screed or tile adhesives.

The invention will be illustrated further with reference to the examples that follow, without restricting the scope to the specific embodiments described. If not otherwise specified any amount in % or parts is by weight and in the case of doubt referring to the total weight of the composition/mixture concerned.

The invention further includes all combinations of described and especially of preferred features that do not exclude each other. A characterization as "approximately", "around" and similar expression in relation to a numerical value means that up to 10% higher and lower values are included, preferably up to 5% higher and lower values, and in any case at least up to 1% higher and lower values, the exact value being the most preferred value or limit.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

EXAMPLES

Two clinkers from a cement plant of HeidelbergCement AG, granulated blast furnace slag used by HeidelbergCement AG for cement production and limestone from a cement plant of HeidelbergCement AG were used. The chemical composition determined by XRF is listed in table 1. LOI means loss on ignition, i.e. calcination at the given temperature. Limestone was used as the mineral filler.

TABLE 1

|  | Clinker 1 | Clinker 2 | Slag | Limestone | Calcium sulfate |
| --- | --- | --- | --- | --- | --- |
| LOI | 0.29 (at 950° C.) | 0.23 (at 950° C.) | (+1.66) (at 950° C.) | 42.8 (at 1050° C.) | 4.1 (at 1050° C.) |
| SiO2 | 20.42 | 21.27 | 35.77 | 1.69 | 2.44 |
| Al2O3 | 5.58 | 5.72 | 11.76 | 0.55 | 0.77 |
| TiO2 | 0.29 | 0.28 | 1.02 | 0.03 | 0.023 |
| MnO | 0.05 | 0.04 | 0.26 | 0.04 | 0.00 |
| Fe2O3 | 3.77 | 3.26 | 0.42 | 0.21 | 0.27 |
| CaO | 65.19 | 65.64 | 42.73 | 53.71 | 37.89 |
| MgO | 1.59 | 1.81 | 5.07 | 0.71 | 1.63 |
| K2O | 1.2 | 0.9 | 0.39 | 0.05 | 0.18 |
| Na2O | 0.18 | 0.07 | 0.08 | 0.01 | 0 |
| SO3 | 0.94 | 0.54 | 2.41 | 0.09 | 51.44 |
| P2O5 | 0.19 | 0.13 | 0.02 | 0.04 | 0.02 |
| Sum − LOI | 99.69 | 99.89 | 99.93 | 99.93 | 98.77 |

The cement clinker, slag and limestone were ground in a laboratory 3.5 kg ball mill (load of the mill). The time of grinding was 90 minutes for examples 1 to 3 and 60 minutes for example 4. Materials were ground separately or co-ground with and without addition of amines. Amines were introduced directly into the mill. The same energy was used for grinding the materials without and with additives. If needed, materials were crushed in a laboratory jaw crusher before grinding. Subsequently the composite cements were prepared by homogenization by grinding in the ball mill for 15 minutes. The cement composition was 50% by weight cement clinker, 40% by weight of slag and 10% by weight limestone according to EN197-1 standard. $SO_3$ content was 2.7% by weight. The performance of the cement in mortar was tested according to EN196-1 (compressive strength) and EN196-3 (water demand).

Example 1

The effect of grinding binder components together or separately was tested. Further the effect of adding amines during grinding was examined. Clinker 1 and slag were ground either together (Inv1, Inv2) or separately (Com1, Com2, Com3) with the same amount of Diethanolisopropanolamine (DEIPA) added relative to the binder (Inv 2, Com2, Com3) or without added amine (Inv1, Com1). Further, the effect of co-grinding the mineral filler was examined (Com4 and Com5). Table 2 summarizes the samples, measured water demands, and compressive strengths.

It is readily apparent that co-grinding of clinker and slag in the samples according to the invention resulted in better compressive strength, independently of the amine additions, as compared to the separately ground samples. Also, co-grinding the mineral filler adversely affects the final strength and additionally results in the highest water demand. While an addition of amine during grinding generally improves the strength achieved, the optimal strength is only provided by co-grinding and addition of amine. The composite cement according to the invention can be made without investment into a separate mill for the latent hydraulic material.

TABLE 2

| Sample | clinker and slag ground | Amount of DEIPA | added to | water demand | compressive strength [MPa] after | | | |
|---|---|---|---|---|---|---|---|---|
| | | | | | 1 d | 2 d | 7 d | 28 d |
| Inv1 | together | — | — | 27.0% | 8.4 | 18.1 | 35.4 | 51.6 |
| Inv2 | together | 0.0278 wt % | combined clinker + slag | 28.0% | 12.0 | 21.4 | 40.9 | 60.0 |
| Com1 | separately | — | — | 26.5% | 6.4 | 15.8 | 33.1 | 51.1 |
| Com2 | separately | 0.05 wt % | clinker | 27.0% | 11.5 | 20.7 | 38.1 | 57.1 |
| Com3 | separately | 0.0627 wt % | slag | 27.5% | 10.5 | 19.1 | 38.6 | 57.3 |
| Com4 | together with limestone | — | — | 28.5% | 8.0 | 17.3 | 34.1 | 47.8 |
| Com5 | together with limestone | 0.025 wt % | clinker + slag + limestone | 27.0% | 10.1 | 19.1 | 36.9 | 54.2 |

Example 2

In this example another clinker was tested and the effect of different amounts of DEIPA. Clinker 2 and slag were ground either together (Inv10, Inv11, Inv12) or separately (Com10-18) and different amounts of DEIPA were added (Inv11, Inv12 and Com11-18). Table 3 summarizes the samples, measured water demands, and compressive strengths.

This example confirms that co-grinding cement and slag increases strength compared to separate grinding. Grinding with DEIPA results in an additional strength increase. Thus, with co-grinding of clinker and slag together with the addition of an amine the amount of filler can be considerably increased still obtaining sufficient strength.

Example 3

In this example Triisopropanolamine (TIPA) was used as amine, in all other respects it was proceeded as in example 2. The samples listed in table 4 were made and examined, the results are also listed in table 4.

This example shows that the effect of TIPA is the same as that of DEIPA. But again, contrary to the prior art, grinding clinker and slag together achieves a significant strength increase.

What is claimed is:

1. A composite cement obtained by grinding a latent hydraulic material and a portland cement clinker together to provide a ground mixture and combining the ground mixture with one or more ground mineral fillers, wherein an amine grinding aid is present during grinding of the Portland cement clinker and latent hydraulic material.

2. The composite cement according to claim 1, wherein the latent hydraulic material is slag and/or calcium rich fly ash.

3. The composite cement according to claim 1, wherein the mineral filler is stone dust.

4. The composite cement according to claim 1, wherein the composite cement comprises 30 to 75% by weight Portland cement clinker, 20 to 60% by weight latent hydraulic material, and 5 to 20% by weight mineral filler, all with respect to the total amount of composite cement.

5. The composite cement according to claim 1, wherein a ratio of the Portland cement clinker to the latent hydraulic material is from 0.8 to 3.0.

6. The composite cement according to claim 1, further containing a calcium sulfate, as anhydrite, hemi hydrate or gypsum or any mixture of the foregoing.

TABLE 3

| Sample | clinker and slag ground | Amount of DEIPA | added to | water demand | compressive strength [MPa] after | | | |
|---|---|---|---|---|---|---|---|---|
| | | | | | 1 d | 2 d | 7 d | 28 d |
| Inv10 | together | — | — | 31.0% | 10.4 | 19.3 | 39.2 | 55.0 |
| Inv11 | together | 0.025 wt % | combined clinker + slag | 33.5% | 13.6 | 24.5 | 47.2 | 62.8 |
| Inv12 | together | 0.05 wt % | combined clinker + slag | 33.5% | 15.1 | 25.9 | 48.2 | 63.2 |
| Com10 | separately | — | — | 33.5% | 8.0 | 14.9 | 35.1 | 51.7 |
| Com11 | separately | 0.05 wt % | clinker | 33.0% | 13.1 | 22.5 | 43.1 | 60.6 |
| Com12 | separately | 0.1 wt % | clinker | 35.5% | 13.3 | 23.8 | 43.8 | 61.9 |
| Com13 | separately | 0.005 wt % | clinker | 29.5% | 9.4 | 18.3 | 38.3 | 57.0 |
| Com14 | separately | 0.01 wt % | clinker | 31.0% | 12.0 | 20.9 | 41.2 | 58.1 |
| Com15 | separately | 0.025 wt % | clinker | 30.0% | 10.0 | 19.0 | 37.6 | 57.4 |
| Com16 | separately | 0.1 wt % | slag | 33.0% | 9.7 | 18.7 | 40.6 | 59.7 |
| Com17 | separately | 0.2 wt % | clinker | 36.0% | 11.4 | 22.0 | 45.1 | 60.4 |
| Com18 | separately | 0.1 wt % | each of clinker and slag | 37.0% | 10.0 | 22.7 | 46.2 | 65.1 |

TABLE 4

| Sample | clinker and slag ground | Amount of TIPA | added to | water demand | compressive strength [MPa] after | | | |
|---|---|---|---|---|---|---|---|---|
| | | | | | 1 d | 2 d | 7 d | 28 d |
| Inv20 | together | 0.05 wt % | combined clinker + slag | 34.5% | 12.4 | 23.5 | 46.9 | 65.3 |
| Com20 | separately | 0.1 wt % | clinker | 34.5% | 11.2 | 21.9 | 43.3 | 59.5 |

7. The composite cement according to claim 1, wherein the amine grinding aid is selected from Triethanolamine, Triisopropanolamine, Diethanolisopropanolamine or any mixture of the foregoing.

8. The composite cement according to claim 2, wherein the latent hydraulic material is granulated blast furnace slag and/or calcium rich fly ash.

9. The composite cement according to claim 3, wherein the mineral filler is selected from the group consisting of limestone, dolomite, marl, granite or a mixture of two or more of these.

10. The composite cement according to claim 4, wherein the latent hydraulic material is granulated blast furnace slag and/or calcium rich fly ash, and the mineral filler is limestone.

11. The composite cement according to claim 10, wherein the amine grinding aid is selected from Triethanolamine, Triisopropanolamine, Diethanolisopropanolamine or any mixture of the foregoing.

12. A binder containing the composite cement according to claim 1 and an admixture and/or an additive.

13. The binder according to claim 12, containing a plasticizer as the admixture selected from the group consisting of lignosulfonates, hydroxy carboxylic acids and salts thereof, gluconates, fruit acids, phosphonates, phosphates, boric acid and salts thereof, or any mixture of the foregoing.

14. The binder according to claim 13, further containing a sulfate.

15. A method of making a building material by mixing the composite cement according to claim 1 with aggregates to form concrete for pre-cast units, or to form cast-in situ concrete or to provide a construction material.

16. The binder according to claim 12, wherein the composite cement comprises 30 to 75% by weight Portland cement clinker, 20 to 60% by weight latent hydraulic material, and 5 to 20% by weight mineral filler all with respect to the total amount of composite cement.

17. The binder according to claim 16, wherein the latent hydraulic material is granulated blast furnace slag and/or calcium rich fly ash, and the mineral filler is limestone.

18. A method of manufacturing a composite cement comprising the steps of grinding a latent hydraulic material and a portland cement clinker together, in the presence of at least one amine, to provide a ground mixture and combining the ground mixture with one or more mineral fillers.

19. The method according to claim 18, wherein the latent hydraulic material and portland cement clinker are ground to a fineness from 2500 $cm^2/g$ to 8000 $cm^2/g$ according to Blaine.

20. The method according to claim 18, wherein the ground mixture is combined with the mineral filler by homogenising in a device used for grinding and/or in a static or dynamic powder mixing device.

* * * * *